US010829139B2

(12) United States Patent
Tosh

(10) Patent No.: US 10,829,139 B2
(45) Date of Patent: Nov. 10, 2020

(54) HORN FOR SHOPPING CART

(71) Applicant: Unarco Industries LLC, Wagoner, OK (US)

(72) Inventor: Phillip Leon Tosh, Coweta, OK (US)

(73) Assignee: Unarco Industries LLC, Wagoner, OK (US)

( * ) Notice: Subject to any disclaimer, the term of this patent is extended or adjusted under 35 U.S.C. 154(b) by 0 days.

(21) Appl. No.: 16/143,898

(22) Filed: Sep. 27, 2018

(65) Prior Publication Data

US 2020/0101995 A1    Apr. 2, 2020

(51) Int. Cl.
*B62B 3/14*    (2006.01)
*B62B 5/00*    (2006.01)
*B60B 33/00*    (2006.01)

(52) U.S. Cl.
CPC ............ *B62B 3/1492* (2013.01); *B60B 33/00* (2013.01); *B62B 3/14* (2013.01); *B62B 5/00* (2013.01)

(58) Field of Classification Search
CPC ........... B62B 3/1492; B62B 3/14; B62B 5/00; Y10T 6/18; Y10T 6/203; B60B 33/00
USPC ................ 280/33.991; 16/19, 31 R
See application file for complete search history.

(56) References Cited

U.S. PATENT DOCUMENTS

| 2,125,292 | A | * | 8/1938 | Herold | .................... B60B 33/00 16/40 |
| 2,834,608 | A | * | 5/1958 | Wixson | .................... B60G 7/04 280/767 |
| D308,934 | S | * | 7/1990 | Howell | .......................... D8/375 |
| 5,287,594 | A | * | 2/1994 | Hicks | .................. B60B 33/0002 16/20 |
| 5,390,393 | A | * | 2/1995 | Reppert | .............. B60B 33/0002 16/21 |
| 7,168,711 | B2 | * | 1/2007 | Ondrasik | .............. B62B 3/1404 280/33.991 |
| 8,413,295 | B2 | * | 4/2013 | Campbell | ............. B60B 33/045 16/35 D |
| 8,454,035 | B2 | * | 6/2013 | Watson | ..................... B62C 1/08 280/63 |
| 2008/0309037 | A1 | * | 12/2008 | Hebert | .................. B62B 3/1404 280/33.992 |

\* cited by examiner

*Primary Examiner* — John D Walters
(74) *Attorney, Agent, or Firm* — Arnold & Porter Kaye Scholer LLP

(57) ABSTRACT

A horn for a shopping cart includes a base plate and a pair of legs extending downwardly away from the base plate and opposed to one another. Each leg includes a first end connected to the base plate, an opposed second end, a central portion positioned between the first end and the second end, a first aperture, and a second aperture, with the first and second apertures being vertically aligned with one another and positioned proximate the second end.

12 Claims, 4 Drawing Sheets

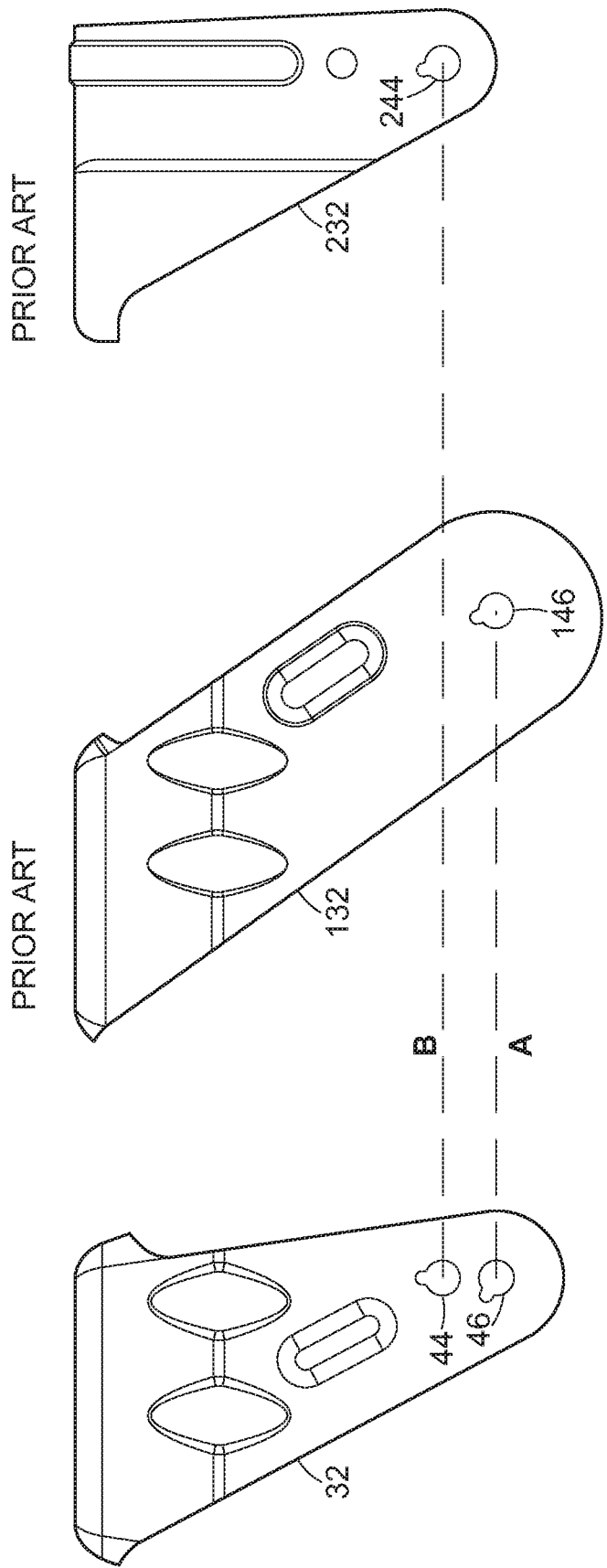

HORN FOR SHOPPING CART

FIELD

Aspects of this disclosure relate generally to a horn for a shopping cart, and more particularly, to a rear horn that is configured to be attached to shopping carts with different configurations.

BACKGROUND

Shopping carts for the American-market are typically wire-made with a distinctive construction of a frame, casters, basket, hinged back gate and a child seat. The frame is composed of a chassis and a handle, and is made up of multiple, bent steel tubes. The frame sits atop four horns with wheels, the rear two of which track forward and back, and the front two of which swivel. The horns are typically welded to the frame. A lower shelf of wire lies between the lower side rails of the chassis. The frame handle rises in the back from the chassis to form the user's "steering mechanism." The basket is see-through, made of wires, and mounts atop the frame, forward of the handle. A hinged back gate with a folding child seat completes the basket and allows the carts to nest with each other in the manner familiar to all shoppers in stores with carts.

Such shopping carts may come in different sizes including a standard sized cart and a Slimline cart. Standard carts and Slimline carts have different sized and shaped rear horns to accommodate the different configurations of the two types of carts. The Slimline rear horn allows the Slimline carts to sit higher, which eliminates interference when they are nested with one another. While standard carts can be nested with other standard carts and Slimline carts can be nested with other Slimline carts, standard carts and Slimline carts cannot be nested with one another due to differences in their heights.

It would be desirable to provide a horn for a grocery cart that can be used on both standard and Slimline carts and that reduces or overcomes some or all of the difficulties inherent in prior known devices. Particular objects and advantages will be apparent to those skilled in the art, that is, those who are knowledgeable or experienced in this field of technology, in view of the following disclosure and detailed description of certain embodiments.

SUMMARY

In accordance with a first aspect, a horn for a shopping cart includes a base plate and a pair of legs extending downwardly away from the base plate and opposed to one another. Each leg includes a first end connected to the base plate, an opposed second end, a central portion positioned between the first end and the second end, a first aperture, and a second aperture, with the first and second apertures being vertically aligned with one another and positioned proximate the second end In accordance with another aspect, a horn for a shopping cart includes a base plate and a pair of legs extending downwardly away from the base plate and opposed to one another. Each leg includes a first end connected to the base plate and an opposed second end, a central portion positioned between the first and second ends, an angled portion extending downwardly and outwardly from the first end to the central portion, a first aperture, and a second aperture, with the first and second apertures being vertically aligned with one another and positioned proximate the second end.

In accordance with yet another aspect, a shopping cart includes a frame including a chassis and a handle, a wire frame basket secured to the frame and having a hinged back gate, and a shelf secured to the chassis beneath the basket. A pair of front horns are secured to the frame, and a pair of rear horns are secured to the frame. Each rear horn includes a base plate and a pair of legs extending downwardly away from the base plate and opposed to one another. Each leg includes a first end connected to and angled outwardly from the base plate, an opposed second end, a central portion positioned between the first end and the second end, a first aperture, and a second aperture, with the first and second apertures being vertically aligned with one another and positioned proximate the second end. Each of a plurality of wheels is rotatably secured to one of the horns.

These and additional features and advantages disclosed here will be further understood from the following detailed disclosure of certain embodiments, the drawings thereof, and from the claims.

BRIEF DESCRIPTION OF THE DRAWINGS

The foregoing and other features and advantages of the present embodiments will be more fully understood from the following detailed description of illustrative embodiments taken in conjunction with the accompanying drawings in which:

FIG. 5 is a side elevation view of the rear horn of FIG. 2.

FIG. 6 is a side elevation view of a Prior Art rear horn.

FIG. 7 is a side elevation view of another Prior Art rear horn.

Figure 1:
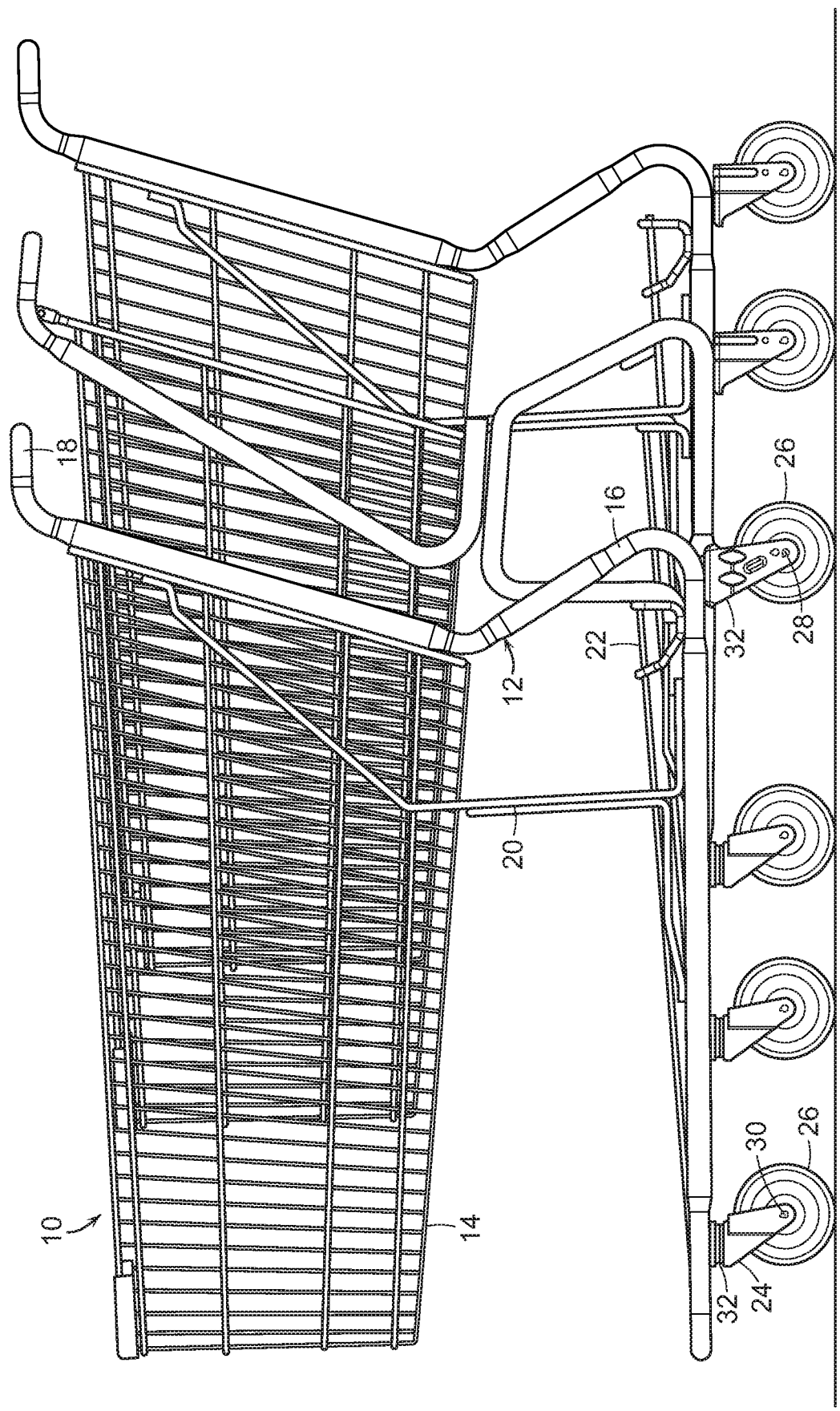
FIG. 1 is an elevation view of a plurality of shopping carts shown nested together.

The figures referred to above are not drawn necessarily to scale, should be understood to provide a representation of particular embodiments, and are merely conceptual in nature and illustrative of the principles involved. Some features of the horn for a shopping cart depicted in the drawings have been enlarged or distorted relative to others to facilitate explanation and understanding. The same reference numbers are used in the drawings for similar or identical components and features shown in various alternative embodiments. Horns for shopping carts as disclosed herein would have configurations and components determined, in part, by the intended application and environment in which they are used.

DETAILED DESCRIPTION OF EMBODIMENTS

In the following description of various example structures in accordance with the disclosure, reference is made to the accompanying drawings, which form a part hereof, and in which are shown by way of illustration of various structures in accordance with the disclosure. Additionally, it is to be understood that other specific arrangements of parts and structures may be utilized, and structural and functional modifications may be made without departing from the scope of the present disclosure. Also, while spatial terms such as "top", "bottom", rear, front, vertical, and the like may be used in this specification to describe various example features and elements of the disclosure, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this disclosure.

Referring to FIG. 1, three shopping carts 10 are shown in a nested condition. Shopping cart 10 includes a frame 12 and a basket 14 supported on frame 12. Frame 12 may be formed from steel tubing and may include a chassis 16. Frame 12 may also include a handle 18, a basket support 20 that supports basket 14, and a shelf 22 positioned beneath basket 14.

Basket 14 may include a swinging rear gate (not visible in FIG. 1), and may be formed of a plurality of longitudinal and transverse wires that are welded together to form a mesh. The welded mesh is then used to forms the sides and bottom of the basket, as well as the swinging rear gate. The longitudinal and transverse wires may be formed of steel or another metal, and may be joined by resistance welding.

Each of a pair of front horns 24 may include a wheel 26 rotatably secured to front horn 24 on a shaft 28. Front horns 24 may be secured to a bottom of chassis 16 by swivels 26 proximate a front of shopping cart 10, which let the wheels to pivot and allow a user to steer shopping cart 10. Swivels 26 may be secured to chassis 16 by welding.

Each of a pair of rear horns 32 may include a wheel 26 rotatably secured to rear horn 32 on a shaft 28. Rear horns 32 may be secured to a bottom of chassis 16 by welding.

Figure 2:
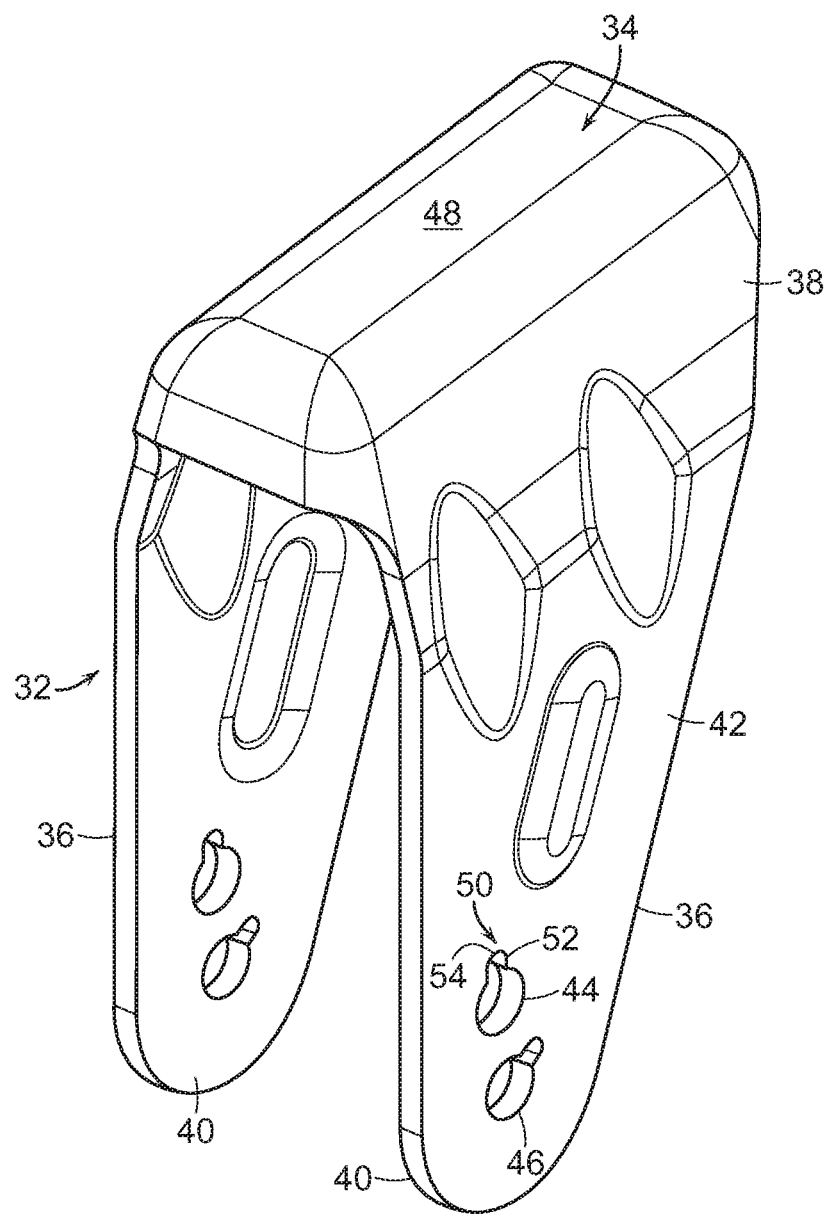
FIG. 2 is a perspective view of a rear horn of a shopping cart of FIG. 1.
Figure 3:
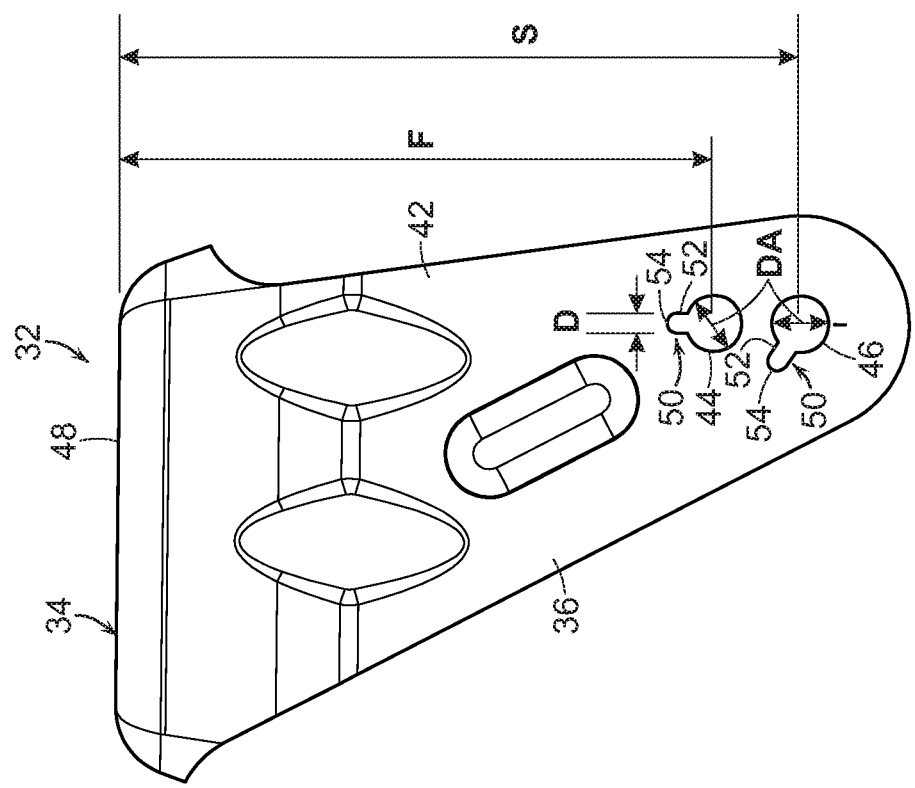
FIG. 3 is a side elevation view of the rear horn of FIG. 2.

A rear horn 32 is shown in FIGS. 2 and 3, and may include a base plate 34 and a pair of legs 36 extending downwardly from base plate 34. Each leg 36 may include a first end 38 connected to base plate 34 and an opposed second end 40. A central portion 42 may be positioned between first end 38 and second end 40. It is to be appreciated that second end 40 may be a free end, that is, it may be unattached to any other elements other than central portion 42 of rear horn 36. In certain embodiments, second end may have a rounded or hemi-spherical shape.

Each leg 36 may include a first aperture 44 and a second aperture 46, each of which may be through apertures extending completely through leg 36. Apertures 44 and 46 may be vertically aligned with one another, and positioned proximate second end 40 of leg 36. In certain embodiments, first aperture 44 and second aperture are circular in shape and may have a diameter DA of approximately 0.327 inches.

The term "approximately" as used herein is meant to mean close to, or about a particular value, within the constraints of sensible commercial engineering objectives, costs, manufacturing tolerances, and capabilities in the field of shopping cart manufacturing and use. Similarly, the term "substantially" as used herein is meant to mean mostly, or almost the same as, within the constraints of sensible commercial engineering objectives, costs, manufacturing tolerances, and capabilities in the field of shopping cart manufacturing and use.

When shopping cart 10 is assembled, a shaft 28 can be received in either of first aperture 44 or second aperture 46 in order to rotatably secure a wheel 26 to rear horn 36.

It is to be appreciated that rear horn 32 may be a unitary, integral, monolithic element. That is, the entirely of rear horn 32, including base plate 34 and legs 36 may be of one-piece construction, and not separate elements formed and subsequently secured or attached to one another.

In certain embodiments, as shown in FIG. 3, a centerpoint of first aperture 44 may be positioned a distance F from an uppermost exterior surface 48 of base plate 34. A centerpoint of second aperture 46 may be positioned a distance S from uppermost exterior surface 48, and may be positioned vertically below the centerpoint of first aperture 44. In certain embodiments, a ratio of a distance S to distance F is approximately 1.146. In certain embodiments, distance F may be approximately 3.428 inches and distance S may be approximately 3.928 inches.

Having both first and second apertures 44, 46 allows rear horn 32 to be used with both standard carts and Slimline carts, which have different heights. Thus, the rear end of shopping cart 10 can be raised or lowered, depending on which aperture is used to receive shaft 28 and wheel 26. This helps eliminate interference between nested shopping carts, and eliminates the need for manufacturing multiple types of horns for different shopping carts.

In certain embodiments, an aperture extension 50 may extend outwardly from and be in communication with each of first aperture 44 and second aperture 46. Aperture extension 50 may include a pair of opposed sidewalls 52 that extend outwardly from the aperture and may be connected to one another by a hemispherical portion 54.

In certain embodiments, sidewalls 52 are spaced apart a distance D from one another. In certain embodiments, distance D may be approximately 0.118 inches. In certain embodiments, sidewalls 52 of the aperture extension 50 of first aperture 44 may extend vertically, and substantially perpendicular to exterior surface 48 of base plate 34. In certain embodiments, sidewalls 52 of the aperture extension 50 of second aperture 46 extend toward a front of horn 32 at an angle with respect to vertical.

Figure 4:
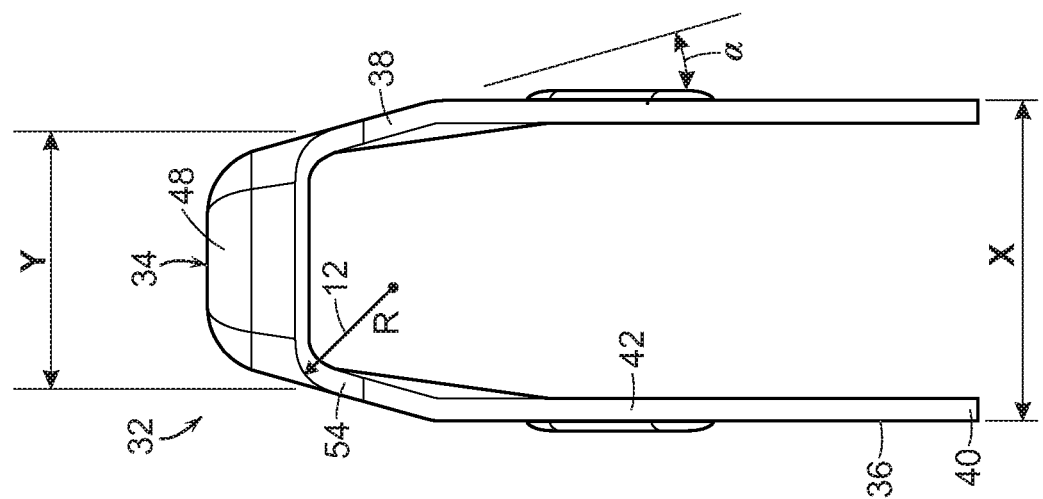
FIG. 4 is a front elevation view of the rear horn of FIG. 2.

In certain embodiments, as shown in FIG. 4, first end 38 of each leg 36 may be angled outwardly from base plate 34 to central portion 42. In certain embodiments, leg 36 may be angled outwardly from vertical at angle α. In certain embodiments, angle α may be approximately 15.6 degrees. The narrower aspect of rear horn 32 at its upper end helps to eliminate interference with the tubular chassis elements of the frame of adjacent shopping carts 10 when the carts are nested together.

In certain embodiments, rear horn 32 may have a width X at the second ends 40 of legs 36, and a width Y at base plate 34. In certain embodiments, a ratio of a width X to width Y is approximately 1.65. In certain embodiments, width X is approximately 1.898 inches and width Y is approximately 1.150 inches.

In certain embodiments, the intersection of base plate 34 and first end 38 may include rounded over corners 54. In certain embodiments, rounded over corners may be rounded about a radius R of approximately 0.394 inches.

FIGS. 5-7 illustrate the difference between rear horn 32 of the present application and rear horns of the prior art, with rear horn 32 being shown in FIG. 5, a rear horn 132 for a Slimline cart being shown in FIG. 6, and a rear horn 232 for a standard shopping cart being shown in FIG. 7.

As can be seen here, first aperture 44 of rear horn 32 is positioned along the same horizontal line A that the first aperture 146 of rear horn 132 of a Slimline shopping cart is positioned along, such that the wheels mounted by a shaft in these apertures are mounted at the same position.

Similarly, first aperture 44 of rear horn 32 is positioned along the same horizontal line B that the first aperture 244 of rear horn 232 of a standard shopping cart is positioned along, such that the wheels mounted by a shaft in these apertures are mounted at the same position.

Therefore, rear horn 32 can be adapted to either a Slimline shopping cart or a standard shopping cart by mounting the wheels to the first aperture 44 or the second aperture 46 as required.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above examples, but is encompassed by the following claims. All publications and patent applications cited above are incorporated by reference in their entirety for all purposes to the same extent as if each individual publication or patent application were specifically and individually indicated to be so incorporated by reference.

What is claimed is:

1. A horn for a shopping cart comprising:
  a base plate having an upper surface configured to be directly secured to a bottom of a frame of a shopping cart and extending in a horizontal first plane at a first angle; and
  a pair of legs, a first of the legs extending downwardly away from one side of the base plate and a second of the legs extending downwardly away from an opposed side of the base plate,
  wherein each leg includes a first end connected to the base plate, the first end extending downwardly and outwardly from the base plate in a second plane at a second angle different than the first angle, a first side extending downwardly away from the base plate, a second side opposed to the first side and extending downwardly away from the base plate, with an entirety of the first and second sides defining outer surfaces of each leg, an opposed second end opposite the upper surface of the base plate and extending from the first side to the second side, a central portion positioned between the first end and the second end, the central portion extending in a third plane vertically downward from the first end to the second end, a first circular aperture, and a second circular aperture positioned directly vertically below the first aperture, the first and second apertures being positioned proximate the second end, the first aperture including a first aperture extension having a pair of sidewalls connected to one another by a hemispherical portion, and extending vertically from the circular aperture and perpendicular to an exterior surface of the base plate, the second aperture including a second aperture extension having a pair of sidewalls connected to one another by a hemispherical portion, and extending from the circular aperture toward a front of the horn at an acute angle with respect to vertical.

2. The horn of claim 1, wherein a centerpoint of the first aperture is positioned approximately 3.428 inches from an uppermost exterior surface of the base plate.

3. The horn of claim 1, wherein a centerpoint of the second aperture is positioned approximately 3.928 inches from an uppermost exterior surface of the base plate.

4. The horn of claim 1, wherein a centerpoint of the first aperture is spaced approximately 0.5 inches from a centerpoint of the second aperture.

5. The horn of claim 1, wherein a ratio of a distance of a centerpoint of the second aperture from an uppermost exterior surface of the base plate to a distance of a centerpoint of the first aperture from the uppermost exterior surface of the base plate is approximately 1.146.

6. The horn of claim 1, wherein a diameter of each of the first and second apertures is approximately 0.327 inches.

7. The horn of claim 1, wherein the first angle is approximately 15.6 degrees with respect to vertical.

8. The horn of claim 1, wherein a ratio of a width of the horn at the second ends of the legs to a width of the horn at the base plate is approximately 1.65.

9. A horn for a shopping cart comprising:
  a base plate having an upper surface configured to be directly secured to a bottom of a frame of a shopping cart and extending in a horizontal first plane at a first angle; and
  a pair of legs, a first of the legs extending downwardly away from one side of the base plate and a second of the legs extending downwardly away from an opposed side of the base plate,
  wherein each leg includes a first end connected to the base plate, a first side extending downwardly away from the base plate, a second side opposed to the first side and extending downwardly away from the base plate, with an entirety of the first and second sides defining outer surfaces of each leg, an opposed second end opposite the upper surface of the base plate and extending from the first side to the second side, a central portion positioned between the first and second ends, an angled portion having a first end connected to the base plate and a second end connected to the central portion and extending downwardly and outwardly from the first end to the central portion in a second plane at a second angle different than the first angle, the central portion extending in a third plane vertically downward from the first end to the second end, a first circular aperture, and a second circular aperture positioned directly vertically below the first aperture, the first and second apertures being positioned proximate the second end, the first aperture including a first aperture extension having a pair of sidewalls connected to one another by a hemispherical portion, and extending vertically from the circular aperture and perpendicular to an exterior surface of the base plate, the second aperture including a second aperture extension having a pair of sidewalls connected to one another by a hemispherical portion, and extending from the circular aperture toward a front of the horn at an acute angle with respect to vertical.

10. The horn of claim 9, wherein the second angle is approximately 15.6 degrees with respect to vertical.

11. The horn of claim 9, wherein a ratio of a width of the horn at the second ends of the legs to a width of the horn at the base plate is approximately 1.65.

12. A shopping cart comprising:
  a frame including a chassis and a handle;
  a wire frame basket secured to the frame and having a hinged back gate;
  a shelf secured to the chassis beneath the basket;
  a pair of front horns secured to the frame;

a pair of rear horns secured to the frame, each rear horn comprising:
   a base plate having an upper surface directly secured to a bottom of the frame and extending in a horizontal first plane at a first angle; and
   a pair of legs, a first of the legs extending downwardly away from one side of the base plate and a second of the legs extending downwardly away from an opposed side of the base plate,
   wherein each leg includes a first end connected to and extending downwardly and outwardly from the base plate in a second plane at a second angle different than the first angle, a first side extending downwardly away from the base plate, a second side opposed to the first side and extending downwardly away from the base plate, with an entirety of the first and second sides defining outer surfaces of each leg, an opposed second end opposite the upper surface of the base plate and extending from the first side to the second side, a central portion positioned between the first end and the second end, the central portion extending in a third plane vertically downwardly from the first end to the second end, a first circular aperture, and a second circular aperture positioned directly vertically below the first aperture, the first and second apertures being positioned proximate the second end, the first aperture including a first aperture extension having a pair of sidewalls connected to one another by a hemispherical portion, and extending vertically from the circular aperture and perpendicular to an exterior surface of the base plate, the second aperture including a second aperture extension having a pair of sidewalls connected to one another by a hemispherical portion, and extending from the circular aperture toward a front of the horn at an acute angle with respect to vertical; and a plurality of wheels, each wheel being rotatably secured to one of the horns.

\* \* \* \* \*